United States Patent
Mo (10) Patent No.: US 7,821,172 B2
(45) Date of Patent: Oct. 26, 2010

(54) MOTOR STATOR WITH DIFFERENT WINDING VOLUME FOR DIFFERENT STATOR TEETH

(75) Inventor: Xu Mo, Cupertino, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 726 days.

(21) Appl. No.: 11/642,499

(22) Filed: Dec. 20, 2006

(65) Prior Publication Data

US 2008/0150388 A1 Jun. 26, 2008

(51) Int. Cl.
*H02K 1/00* (2006.01)
*H02K 7/00* (2006.01)
*H02K 1/06* (2006.01)
*H02K 1/16* (2006.01)

(52) U.S. Cl. .............................. 310/216.001; 310/67 R; 310/216.054; 310/216.072; 310/216.071

(58) Field of Classification Search ................... 310/216, 310/67 R
See application file for complete search history.

(56) References Cited

U.S. PATENT DOCUMENTS

| | | | |
|---|---|---|---|
| 755,890 A * | 3/1904 | Kloepper et al. ............ 246/484 |
| 2,517,105 A * | 8/1950 | Greer .......................... 310/194 |
| 5,296,981 A | 3/1994 | Ogawa |
| 5,633,545 A | 5/1997 | Albrecht et al. |
| 5,853,513 A | 12/1998 | Kelsic |
| 6,051,782 A * | 4/2000 | Wagner ...................... 174/541 |
| 6,728,063 B1 | 4/2004 | Gustafson et al. |
| 6,947,251 B1 * | 9/2005 | Oveyssi et al. ........... 360/78.12 |
| 6,963,469 B1 | 11/2005 | Gustafson et al. |
| 2006/0232159 A1* | 10/2006 | Tamaoka .................... 310/216 |

\* cited by examiner

*Primary Examiner*—Quyen Leung
*Assistant Examiner*—Jose A Gonzalez Quinones
(74) *Attorney, Agent, or Firm*—Shumaker & Sieffert, P.A.

(57) ABSTRACT

A device includes a stator lamination of a stator for a motor with a first set of stator teeth and a second set of stator teeth, a first set of windings with wire having a first diameter on the first set of stator teeth and a second set of wire windings with wire having a second diameter. The second diameter is greater than the first diameter. The first and seconds sets of stator teeth are divided among at least two phases of the motor. Each phase includes an equal number of stator teeth from the first set of stator teeth and an equal number of stator teeth from the second set of stator teeth.

22 Claims, 7 Drawing Sheets

MOTOR STATOR WITH DIFFERENT WINDING VOLUME FOR DIFFERENT STATOR TEETH

TECHNICAL FIELD

The invention relates to electric motors, and more particularly but without limitation, to spindle motors in disc drives.

BACKGROUND

A disc drive includes a spindle motor, which, after spinning up to its specified speed, rotates one or more discs at a constant high speed. Information is written to and read from tracks on the discs through the use of an actuator assembly. The actuator assembly includes actuator arms, which extend towards the discs. Mounted on each of the actuator arms is a read/write head, which includes an air bearing slider enabling the head to fly in close proximity above the corresponding media surface of the associated disc.

Increases in storage media density have allowed disc drive manufactures to produce disc drives with large capacities and small form factors. For example, a five gigabyte disc drive having a smaller profile than a credit card, and a thickness less than a quarter-inch, is currently available. Such small form factor disc drives can be used in portable consumer electronics. In addition to increases in storage media density, reducing the size of other disc drive components allows further reduction in a disc drive form factor.

A typical spindle motor includes an outside stationary stator. The stationary stator includes a motor stator lamination having teeth wrapped in electric coils. The electric coils are supplied with current to produce a rotating magnetic field. The typical spindle motor also includes an inside rotor with poles to capture torque from the rotating field and output the torque to one or more discs in the drive via the disc drive spindle.

By reducing the height of a spindle motor, the overall design height in a disk drive can also be reduced. However, reducing the design height of a spindle motor, e.g., by reducing the winding volume on the stator teeth, generally results in a reduction of the electromagnetic performance of the spindle motor, e.g., it takes more current to produce the same torque. Because the electromagnetic performance of a spindle motor is an important quality factor in a disc drive, a desire to minimize the form factor of a disc drive must be balanced with a need for adequate electromagnetic performance of the disc drive's spindle motor.

SUMMARY

In an embodiment, a device comprises a stator lamination of a stator for a motor with a first set of stator teeth and a second set of stator teeth, a first set of windings with wire having a first diameter on the first set of stator teeth and a second set of wire windings with wire having a second diameter. The second diameter is greater than the first diameter. The first and seconds sets of stator teeth are divided among at least two phases of the motor. Each phase includes an equal number of stator teeth from the first set of stator teeth and an equal number of stator teeth from the second set of stator teeth.

The details of one or more embodiments of the invention are set forth in the accompanying drawings and the description below. Other features, objects, and advantages of the invention will be apparent from the description and drawings, and from the claims.

DETAILED DESCRIPTION

In general, the invention is directed to an electric motor including a stator having different winding volumes on different stator teeth. Embodiments of the invention provide increased utilization of available space. For example, in a disc drive spindle motor, a portion of the spindle motor profile overlaps with the travel area of the actuator arm located between the lowest disc and the motor. Consequently, the portion of the spindle motor that does not overlap with the actuator arm travel area can be made thicker than the portion of the spindle motor profile that does overlap with the travel area of the actuator arm without increasing the overall thickness of the disc drive.

Embodiments of the invention utilize this space by increasing the winding volume on stator teeth corresponding to the portion of the spindle motor profile that does not overlap with the travel area of the actuator arm. Increasing the winding volume on these stator teeth improves the electromagnetic performance of the spindle motor without increasing the overall thickness of the drive. Alternatively, the electromagnetic performance of a spindle motor design can be maintained while reducing the thickness of the spindle motor where the profile of the spindle motor overlaps with the travel area of an adjacent actuator arm. This allows the overall thickness in a disc drive design to be reduced. Some embodiments result in a combination of increased electromagnetic performance and reduced disc drive thickness.

Figure 1:
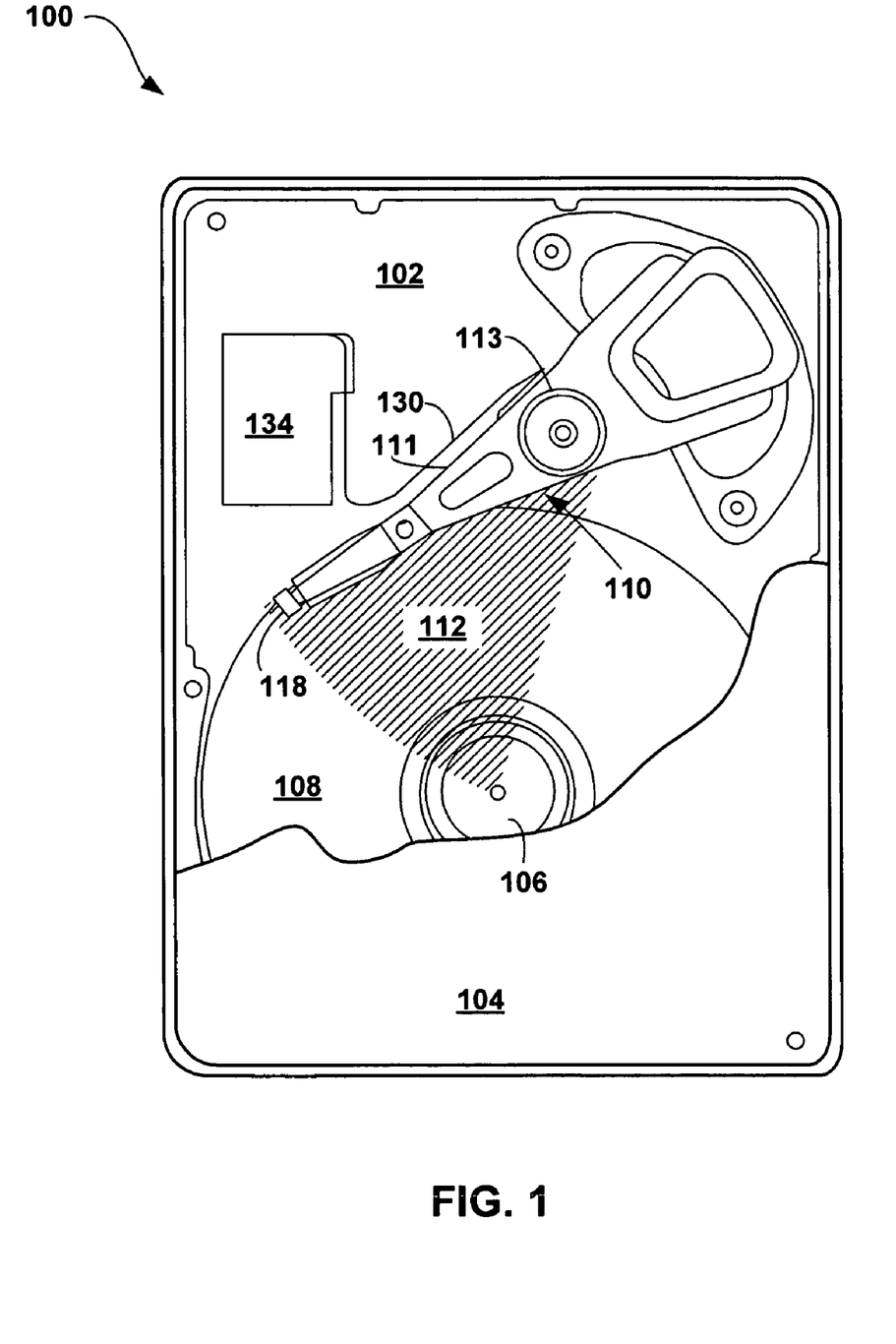
FIG. 1 is an illustration of an exemplary disc drive including a spindle motor having a motor stator with different winding volumes for different stator teeth.

FIG. 1 is a diagram illustrating an exemplary disc drive 100 including spindle motor 106, which has a motor stator with different winding volumes for different stator teeth. Disc drive 100 includes base 102 which cooperates with cover 104 to form a housing that defines an internal environment of disc drive 100. Disc drive 100 also includes a recordable data storage disc 108 and actuator assembly 110. Disc drive 100 may include one or more additional recordable data storage discs stacked below data storage disc 108. Flex assembly 130 provides electrical connection paths to control actuator assembly 110 and allows pivotal movement of actuator assembly 110 during operation. Flex assembly 130 terminates at flex bracket 134 for communication to a disc drive control circuitry (not shown).

Actuator assembly 110 is shown with actuator arm 111 and head 118 and includes one or more additional actuator arms and heads directly below actuator arm 111 and head 118. For example, actuator assembly 110 may include two heads for each of the stacked recordable data storage discs: one for the top side and one for the bottom side of each of the data storage discs. Actuator assembly 110 may also include an actuator arm above and below each data storage disc. Actuator arms in between two discs may carry heads for both adjacent discs. In other embodiments, each recordable data storage disc in a disc drive may include only one side with a data storage surface. For example, a disc drive may include as few as one recordable data storage disc with a single actuator arm and a single head.

Actuator assembly 110 pivots about bearing shaft assembly 113 moving head 118 across media tracks of disc 108. Travel area 112 of actuator assembly 110 overlaps a portion of the profile of spindle motor 106. The travel area of the lowest actuator arm, which is adjacent to spindle motor 106, as part of actuator assembly 110, also moves within travel area 112.

Spindle motor 106 includes a motor stator with different winding volumes for different stator teeth. The teeth within the profile of travel area 112 have a lower winding volume than the teeth that are outside the profile of travel area 112. Because the winding volume on the teeth within the profile of travel area 112 is less than the winding volume of the teeth outside the profile of travel area 112, spindle motor 106 is thinner where its profile overlaps the profile of travel area 112.

The thinner part of spindle motor 106 provides space for the lowest actuator arm of actuator assembly 110, which is adjacent to spindle motor 106, to actuate within the profile of travel area 112. The increased winding volume on teeth in the portion of spindle motor 106 not in the travel area of the lowest actuator arm provides an increased electromagnetic efficiency than if each of the teeth contained a winding volume equal to that of the teeth outside the profile of travel area 112.

Figure 2A:
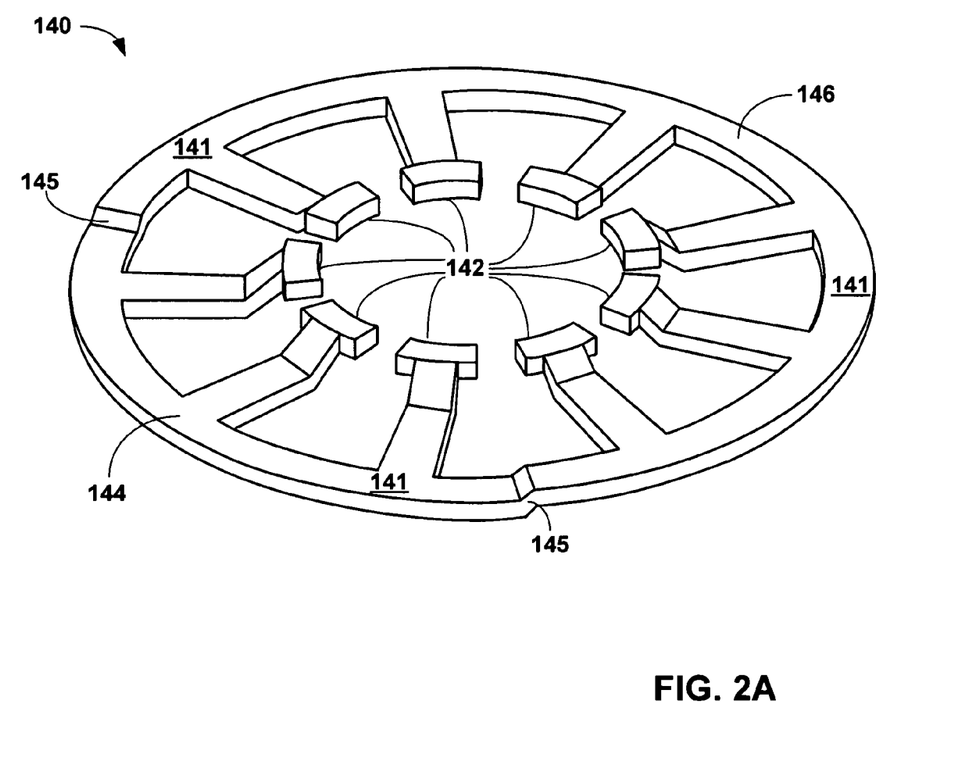
FIGS. 2A-C are illustrations of a motor stator lamination allowing different winding volumes for different stator teeth.
Figure 2B:
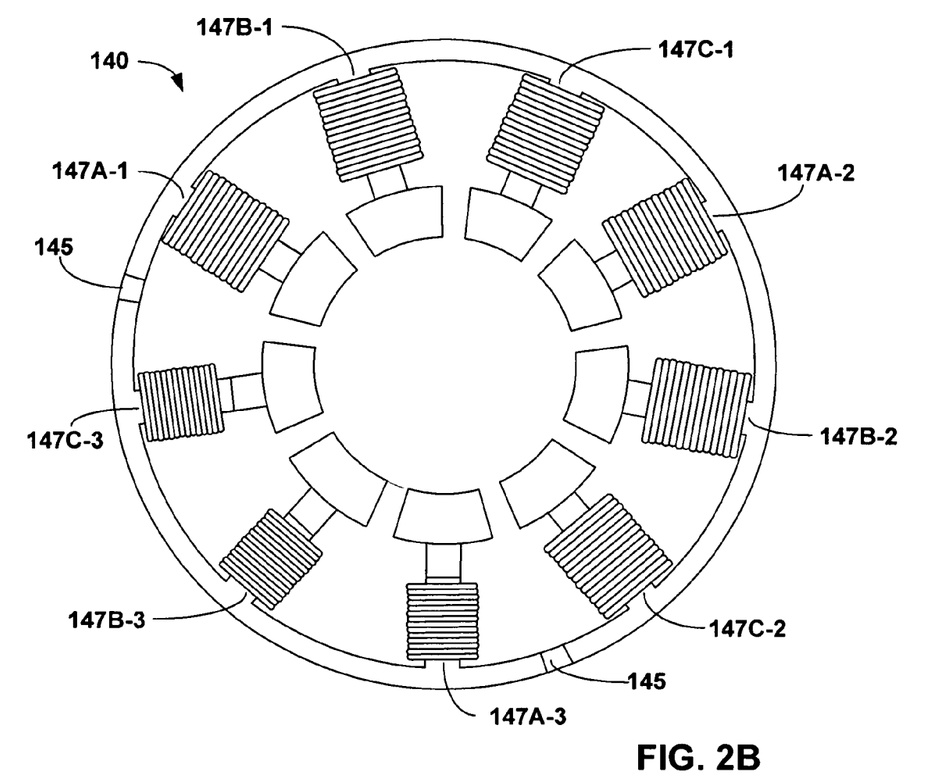
Figure 2C:
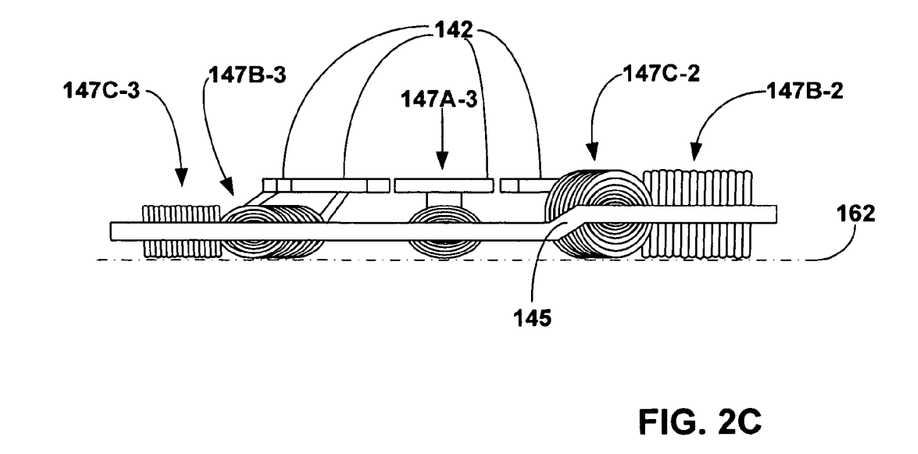

FIGS. 2A-C are illustrations of motor stator lamination 140 of spindle motor 106 including outer ring 141 and teeth 147A-1, 147B-1, 147C-1, 147A-2, 147B-2, 147C-2, 147A-3, 147B-3 and 147C-3 (hereinafter "teeth 147"). Motor stator lamination 140 allows different winding volumes for different stator teeth in spindle motor 106. FIG. 2A shows motor stator lamination 140 without any wire winding, while FIGS. 2B-C show motor stator lamination 140 with wire windings.

Spindle motor 106 is a three-phase spindle motor: windings on teeth 147A-1, 147A-2 and 147A-3 create the first phase, windings on teeth 147B-1, 147B-2 and 147B-3 create the second phase, and windings on teeth 147C-1, 147C-2 and 147C-3 create the third phase. The phase differences between the three phases create a rotating electrical field within spindle motor 106. Other embodiments may include more or fewer phases as appropriate for a particular application.

Motor stator lamination 140 outer ring 141 includes lower portion 144 corresponding to an actuator arm travel area and upper portion 146 corresponding to the area of outside the travel area of an adjacent actuator arm. The term lower refers to the side of spindle motor 106 opposite to the adjacent actuator arm, and the term upper refers to the side of spindle motor 106 closest to the adjacent actuator arm. Bends 145 separate lower portion 144 from upper portion 146. The height difference between lower portion 146 and upper portion 144 corresponds to the different winding volumes on teeth 147A-1, 147B-1, 147C-1, 147A-2, 147B-2 and 147C-2 versus teeth 147A-3, 147B-3 and 147C-3. As shown in FIG. 2C, the bottom sides of each wire winding, i.e., the side opposite to the adjacent actuator arm, are substantially coplanar along geometric plane 162. This design allows the stator to utilize available space while sitting flat even though outer ring 141 is not flat.

The height difference between lower portion 146 and upper portion 144 in combination with the lower winding volumes on teeth 147A-3, 147B-3 and 147C-3 provides space for the adjacent actuator arm to move. The geometric plane of travel of the adjacent actuator arm, which is within travel area 112 and parallel to the page of FIG. 1, intersects the wire windings of teeth 147A-1, 147B-1, 147C-1, 147A-2, 147B-2 and 147C-2. If the adjacent actuator arm could rotate outside travel area 112, it would run into the wire windings of teeth 147A-1, 147B-1, 147C-1, 147A-2, 147B-2 and 147C-2. However, actuator assembly 110, including the actuator arm adjacent to spindle motor 106 has a limited motion as represented by travel area 112 (see FIG. 1) and will not run into the wire windings of teeth 147A-1, 147B-1, 147C-1, 147A-2, 147B-2 and 147C-2 during normal operation of disc drive 100.

Each of teeth 147 includes a bend such that the ends of teeth 147 are aligned at the inner diameter 142 of motor stator lamination 140. Specifically, teeth 147A-3, 147B-3 and 147C-3 include a larger bend than teeth 147A-1, 147B-1, 147C-1, 147A-2, 147B-2 and 147C-2 to compensate for the height difference between lower portion 144 and upper portion 146. This ensures that the actuation forces from teeth 147 on the inside rotor (not shown) of spindle motor 106 are coplanar with each other.

Teeth 147 are spaced equally about outer ring 141. In order to create balanced forces on the on the inside rotor of spindle motor 106, each of teeth 147 have substantially the same number of turns. To create a lower winding volume, the wire on teeth 147A-3, 147B-3 and 147C-3 is smaller than the wire on teeth 147A-1, 147B-1, 147C-1, 147A-2, 147B-2 and 147C-2. Each tooth in a phase is wired in series with every other tooth in that phase; therefore, each winding of a phase experiences the same current. With the same number of turns, each tooth also produces the same electromagnetic induction force on the inside rotor as the other windings in a phase regardless of the size of the wire. In this manner, electromagnetic induction forces are balanced within each phase.

Furthermore, because each phase includes exactly one tooth with the smaller-wire, lower-volume winding and two teeth with the larger-wire, greater-volume winding, the resistance of each phase is the same as the resistance in every other phase. By applying the same voltage for every phase, every phase experiences the same current, and the electromagnetic induction forces are balanced from each phase to the next. By balancing the forces within each phase and between phases, the exemplary embodiment shown in FIGS. 2A-C can be implemented without an increase in operating vibration or a reduction in reliability as compared to a conventional spindle motor that utilizes the same winding volume and the same size wire for every tooth of the stator.

The larger wire on teeth 147A-1, 147B-1, 147C-1, 147A-2, 147B-2 and 147C-2 has a lower resistance than the wire on teeth 147A-3, 147B-3 and 147C-3, which improves the electromagnetic performance of each phase compared to a stator using the smaller-size wire for every tooth. This increase in electromagnetic performance of spindle motor 106 allows disc drive 100 to be thinner than an equivalent disc drive with a conventional spindle motor while still obtaining a desired level of electromagnetic performance of spindle motor 106.

In other embodiments the same size wire may be used on teeth 147A-1, 147B-1, 147C-1, 147A-2, 147B-2 and 147C-2 and on teeth 147A-3, 147B-3 and 147C-3. In such embodiments, teeth 147A-3, 147B-3 and 147C-3 include wire windings having fewer turns than wire windings on teeth 147A-1, 147B-1, 147C-1, 147A-2, 147B-2 and 147C-2. While such a configuration will create an imbalance of forces on a rotor (not shown), rotary bearings may compensate for the imbalance. For example, fluid bearings, e.g., journal bearings, may be used to limit vibration even though forces on teeth 147 may create imbalanced forces. Furthermore, the difference in the number of turns between any of teeth 147 can be selected to create forces that do not result in harmonic vibration near an operating speed of spindle motor 106.

Spindle motor 106 may be manufactured by winding wire having a larger diameter on stator teeth 147A-1, 147B-1, 147C-1, 147A-2, 147B-2 and 147C-2 and by winding wire having a smaller diameter on stator teeth 147A-3, 147B-3 and 147C-3. Manufacturing spindle motor 106 further requires electrically coupling the wire windings in series within each of the three phases: 147. For example, electrically coupling the wire winding may be accomplished by soldering wire wound on stator teeth 147A-1 and 147A-2 to wire wound on stator tooth 147A-3, soldering wire wound on stator teeth 147B-1 and 147B-2 to wire wound on stator tooth 147B-3, and by soldering wire wound on stator teeth 147C-1 and 147C-2 to wire wound on stator tooth 147C-3.

Figure 3:
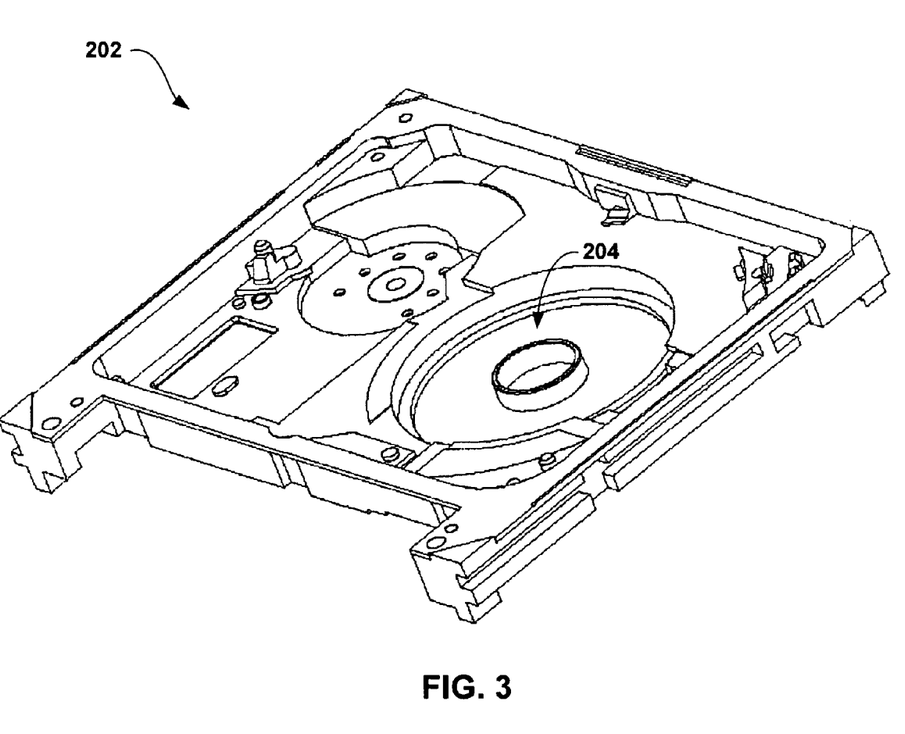
FIG. 3 is an illustration of a disc drive base to provide reference for the close-up illustrations in FIGS. 4-5.
Figure 4:
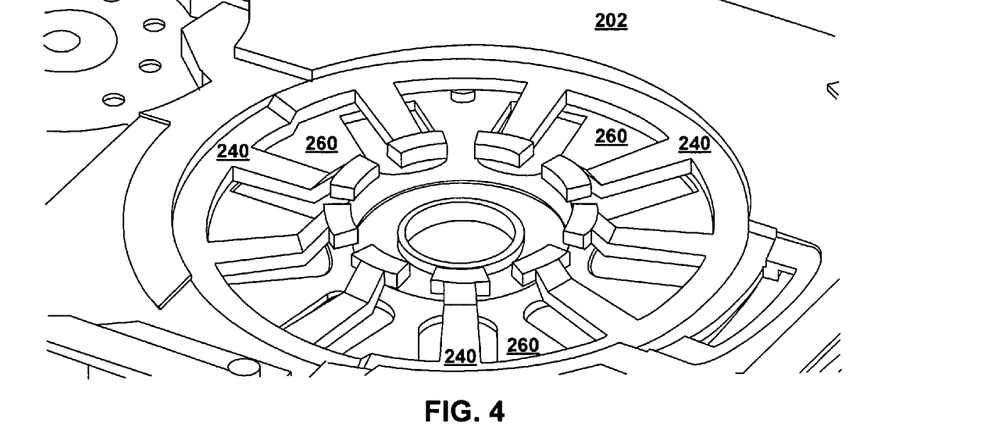
FIG. 4 is a close-up illustration of a disc drive base with a stator-sitting boss plate and a motor stator lamination allowing different winding volumes for different stator teeth.
Figure 5:
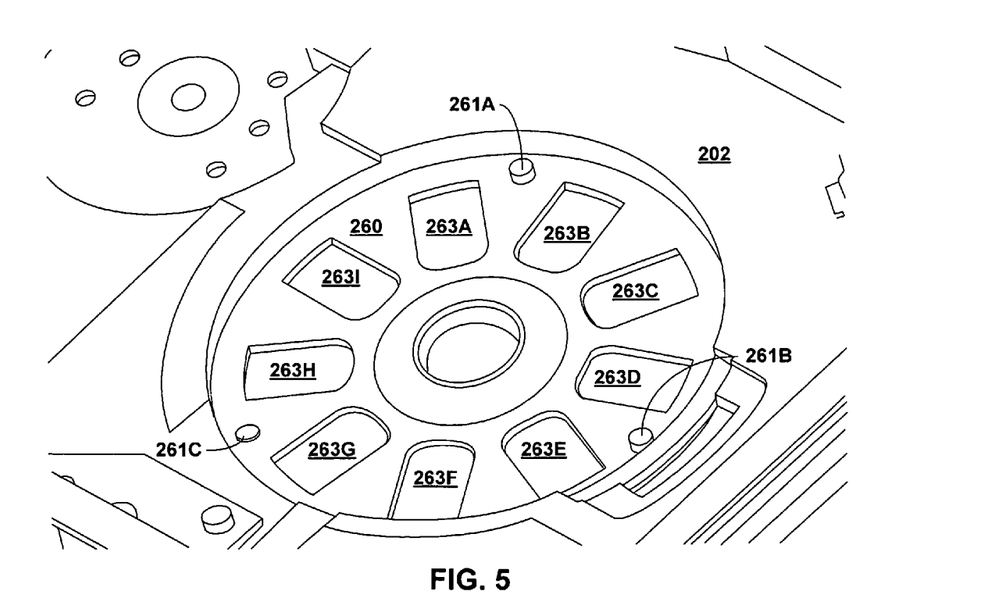
FIG. 5 is a close-up illustration of a disc drive base with a stator-sitting boss plate having bosses with different heights to support a motor stator lamination allowing different winding volumes for different stator teeth.

FIG. 3 is an illustration of disc drive base 202 to provide reference for the close-up illustrations of FIGS. 4-5. Base 202 is similar to base 102 of disc drive 100 in that has a dual function including forming part of an external housing of a disc drive and serves as a mount for various components in the disc drive. Disc drive base 202 includes mount 204 for a spindle motor. For example, a spindle motor may be constrained to base 202 at mount 204 by a top cover of the disc drive, screws, glue, press-fitting, by other means or a combination thereof. While base 202 includes a mount for a spindle motor according to an embodiment of the invention, other disc drive configurations are also within the scope of the invention. For example, a spindle motor may be integrated within a disc drive housing rather than being a separate component mounted to base 102.

FIG. 4 is a close-up illustration of disc drive base 202 with stator-sitting boss plate 260 and motor stator lamination 240 allowing different winding volumes for different stator teeth. For clarity, windings are not shown on motor stator lamination 240. Motor stator lamination 240 is similar to motor stator lamination 140 (FIGS. 2A-C) and may have the same windings as described with respect to motor stator lamination 140.

Stator-sitting boss plate 260 joins with base 202. For example, stator sitting boss plate may be integrated with base 202, press fit into base 202 or otherwise positioned on base 202. As shown in FIG. 5, stator-sitting boss plate 260 has bosses 261 A-C, which have different heights to support motor stator lamination 240 such that motor stator lamination 240 sits flat above base 202. Specifically, bosses 261A-B are taller than boss 261C. Bosses 261A-B support the upper portion of motor stator lamination 240 and boss 261C supports the lower portion of motor stator lamination 240. The difference in height of the support elements matches the difference in height of the upper portion and the lower portion of stator lamination 240. As shown in FIG. 2C with motor stator lamination 140, the bottom sides of each wire winding (not shown in FIGS. 4-5) are substantially coplanar in a geometric plane perpendicular to the axis of rotation of the corresponding spindle (not shown). Other embodiments may include more or less bosses to support motor stator lamination 240.

Stator-sitting boss plate 260 also includes openings 263, which allow windings on teeth of stator lamination 240 to sit lower, further decreasing the thickness of a disc drive. Openings 263A-F correspond to stator teeth on the upper portion of stator lamination 240. Openings 263G-I correspond to stator teeth on the lower portion of stator lamination 240. Because the windings on the lower portion of stator lamination 240 are smaller than the windings on the upper portion of stator lamination 240, openings 263G-I can be smaller than openings 263A-F. Such a feature adds stiffness to stator-sitting boss plate 260 without increasing the thickness of a disc drive.

While stator-sitting boss plate 260 is shown as separate from base 202 in FIGS. 3-5, in other embodiments the structure of stator-sitting boss plate 260, e.g., bosses 261 A-C and openings 263A-I, can be integrated into base 202.

Figure 6:
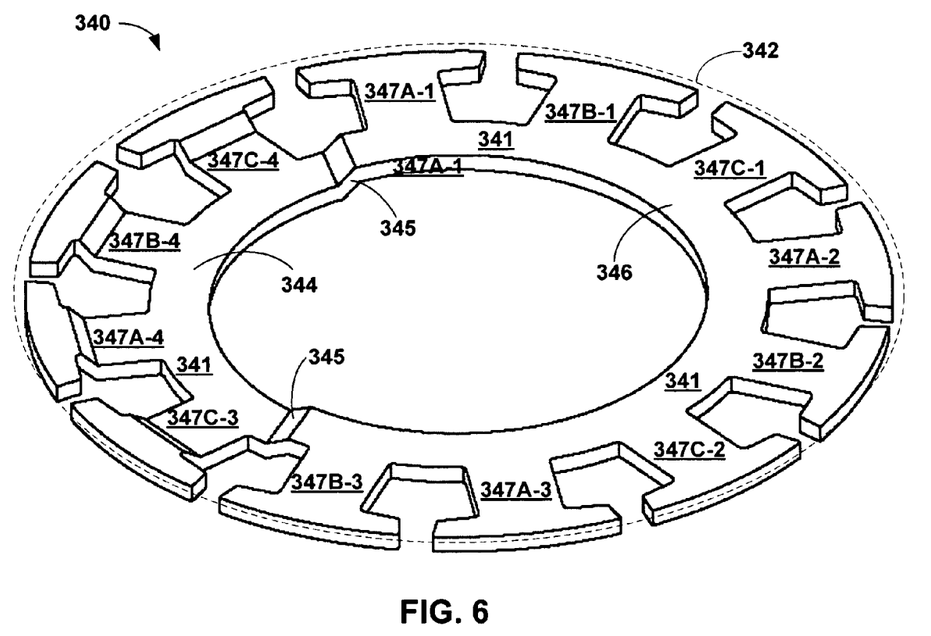
FIG. 6 is an illustration of a motor stator lamination allowing different winding volumes for different stator teeth and the stator teeth outside the ring.

FIG. 6 is an illustration of motor stator lamination 340 providing an alternative embodiment to spindle motor 106. Similar to motor stator lamination 140 of spindle motor 106, motor stator lamination 340 allows different winding volumes for different stator teeth in the motor including motor stator lamination 340. However, motor stator lamination 340 is different than motor stator lamination 140 in at least three ways. First, motor stator lamination 340 includes inner ring 341 rather than outer ring 141. Second, motor stator lamination 340 provides for three phases as represented by teeth 347A-1 to 347A-4, 347B-1 to 347B-4 and 347C-1 to 347C-4 (hereinafter "teeth 347"), but the phases of teeth 347A-1 to 347A-4, 347B-1 to 347B-4 include only one tooth adjacent to lower portion 344, while the phase of teeth 347C-1 to 347C-4 includes two teeth adjacent to lower portion 344. Third, teeth 347A-1, 347B-1, 347C-1, 347A-2, 347B-2, 347C-2, 347A-3 and 347B-3 on upper portion 346 of ring 341 are flat relative to ring 341. Even with these differences as compared to motor stator lamination 140, motor stator lamination 340 provides many of the same advantages as motor stator lamination 140.

The motor including motor stator lamination 340 is a three-phase spindle motor: windings on teeth 347A-1 to 347A-4 create the first phase, windings on teeth 347B-1 to 347B-4 create the second phase, and windings on teeth 347C-1 to 347C-4 create the third phase. The phase differences between the three phases create a rotating electrical field within the motor including motor stator lamination 340. Other embodiments may include more or fewer phases as appropriate for a particular application.

Inner ring 341 includes lower portion 344 corresponding to an actuator arm travel area and upper portion 346 corresponding to the area of outside the travel area of an adjacent actuator arm. Bends 345 separate lower portion 344 from upper portion 346. The height difference between lower portion 346 and upper portion 344 corresponds to different winding volumes for teeth 347A-1, 347B-1, 347C-1, 347A-2, 347B-2, 347C-2, 347A-3 and 347B-3 versus teeth 347C-3, 347A-4, 347B-4 and 347C-4. The bottom sides of each wire winding (not shown), i.e., the side opposite to the adjacent actuator arm, are substantially coplanar. This design allows the stator to utilize available space while sitting flat even though inner ring 341 is not flat.

Teeth 347A-1, 347B-1, 347C-1, 347A-2, 347B-2, 347C-2, 347A-3 and 347B-3 on upper portion 346 of ring 341 are flat relative to ring 341. However, in other embodiments teeth 347A-1, 347B-1, 347C-1, 347A-2, 347B-2, 347C-2, 347A-3 and 347B-3 on upper portion 346 may have a bend to raise teeth 347A-1, 347B-1, 347C-1, 347A-2, 347B-2, 347C-2, 347A-3 and 347B-3 above upper portion 346. In such embodiments, the bends of teeth 347C-3, 347A-4, 347B-4 and 347C-4 may be equivalently larger to compensate for bends on teeth 347A-1, 347B-1, 347C-1, 347A-2, 347B-2, 347C-2, 347A-3 and 347B-3 such that the ends of teeth 347 would still be aligned at outer diameter 342 of motor stator lamination 340.

If the motor including motor stator lamination 340 is a spindle motor, the height difference between lower portion 346 and upper portion 344 in combination with the lower winding volumes on teeth 347C-3, 347A-4, 347B-4 and 347C-4 can provide space for an adjacent actuator arm to move. Each of teeth 347C-3, 347A-4, 347B-4 and 347C-4 include a bend such that the ends of teeth 347 are aligned at outer diameter 342 of motor stator lamination 340. Specifically, teeth 347C-3, 347A-4, 347B-4 and 347C-4 include a bend to compensate for the height difference between lower portion 344 and upper portion 346. This ensures that the actuation forces from teeth 347 on the outside rotor (not shown) of the motor including motor stator lamination 340 are coplanar with each other.

Furthermore, teeth 347 are spaced equally about inner ring 341. As with motor 106, each of teeth 347 will have windings with the same number of phases. However, the phases the motor including motor stator lamination 340 are not naturally balanced if teeth 347C-3, 347A-4, 347B-4 and 347C-4 have a winding with a smaller diameter wire than teeth 347A-1, 347B-1, 347C-1, 347A-2, 347B-2, 347C-2, 347A-3 and 347B-3 because the resistance of the third phase would be greater than the resistance of the first and second phases. In order to balance the forces a resistor has to be added to the electrically coupled series of windings forming the first phase and to the electrically coupled series of windings forming the second phase. In order to balances the forces between phases the resistors should match the difference between the resistance of the first and second phase and the resistance of the third phase.

Another technique to balance the resistance between phases is to use the smaller diameter wire on two teeth from each phase and still have the same number of turns for each of teeth 347. In such an embodiment, the windings volumes on 347A-1, 347B-1, 347C-1, 347A-2, 347B-2, 347C-2, 347A-3 and 347B-3 would not all be the same.

Instead of balancing the resistance of each phase, one technique is to increase the voltage of the third phase relative to the first and second phases such that the current is balanced across each phase. In other embodiments, bearings may be used to compensate for unbalanced forces from teeth 347 on the outside rotor.

Figure 7:
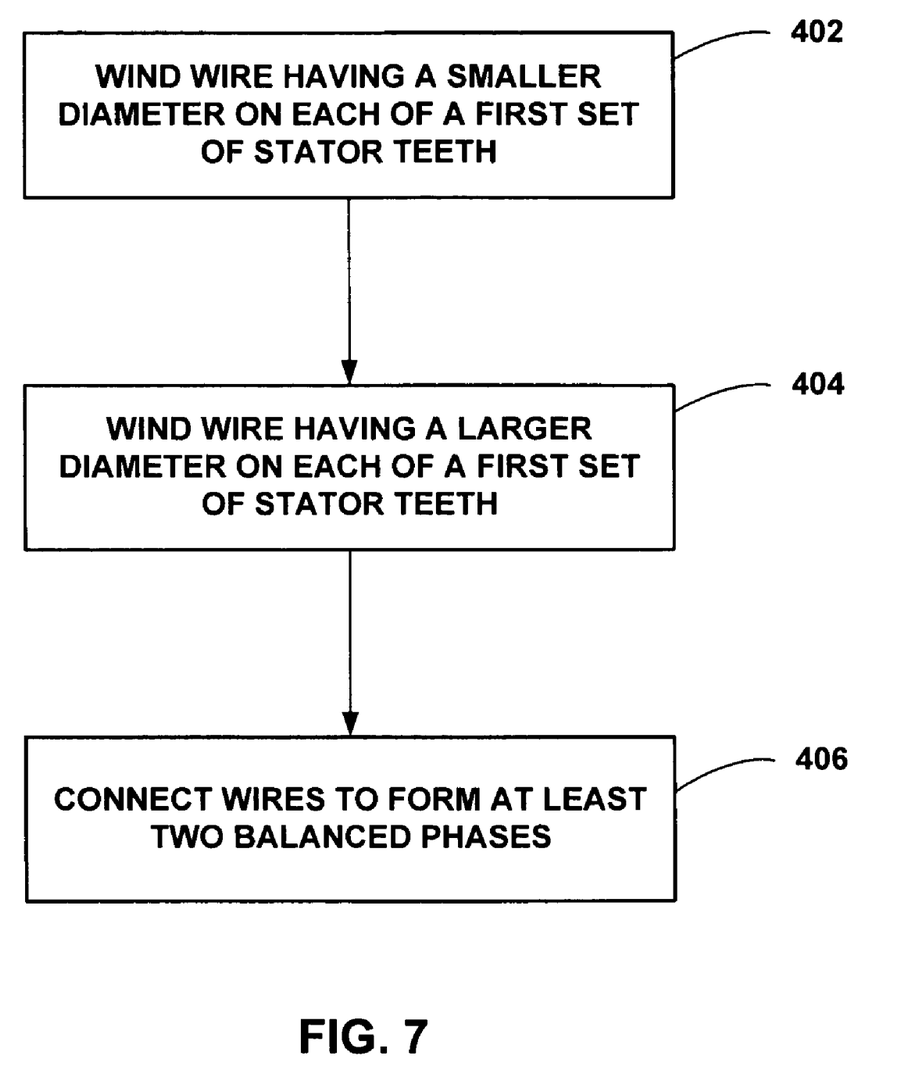
FIG. 7 is a flowchart illustrating techniques for manufacturing a motor stator with different winding volume for different stator teeth.

FIG. 7 is a flowchart illustrating techniques for manufacturing a motor stator with different winding volume for different stator teeth. For clarity, the techniques of FIG. 7 are described with respect to motor stator lamination 140 (FIGS. 2A-2C). A smaller diameter wire is wound on teeth 147A-3, 147B-3 and 147C-3 (402). A larger diameter wire is wound on teeth 147A-1, 147B-1, 147C-1, 147A-2, 147B-2 and 147C-2 (404). An equal number of turns may be wound on each of teeth 147.

Then, the wire windings are electrically coupled to form at least two phases (406). For example, electrically coupling the wire winding on the stator teeth in series for each of the at least two phases may include soldering wire wound on the first set of stator teeth from a phase to wire wound on the second set of stator teeth from the same phase. Each of the phases may include an equal number of teeth with the smaller wire winding and the larger wire winding. The electrically coupled wire in each phase may have the same resistance and inductance as the electrically coupled wire in every other phase. Assuming each of teeth 147 provides the same number of turns and the same current is applied in every phase, each of teeth 147 will provide the same actuation force. Because each phase includes the same number of teeth, each phase will also provide the same actuation force as the other phases.

Various embodiments of the invention have been described. However, various modifications can be made to the described embodiments within the spirit of the invention. For example, the described embodiments include a three phase motor, each phase including exactly three stator teeth, with exactly one of the stator teeth having a lower winding volume. Other embodiments may include more or less phases and more or less stator teeth. Furthermore, more than two different size wires may be used to fully utilize available space.

These and other embodiments are within the scope of the following claims.

The invention claimed is:

1. A device comprising:
  a stator lamination of a stator for a motor with a first set of stator teeth and a second set of stator teeth;
  a first set of windings with a first wire on the first set of stator teeth; and
  a second set of wire windings with a second wire on the second set of stator teeth,
  wherein the diameter of the second wire is greater than the diameter of the first wire,
  wherein the first and seconds sets of stator teeth are divided among at least two phases of the motor, wherein each phase includes an equal number of stator teeth from the first set of stator teeth and an equal number of stator teeth from the second set of stator teeth.

2. The device of claim 1, wherein the wire windings each have substantially the same number of turns.

3. The device of claim 1, further comprising:
  a data storage disc, wherein the motor is a spindle motor operable to rotate the data storage disc;
  a head to read data from the data storage disc; and
  an actuator arm to position the head relative to the data storage disc,
  wherein the actuator arm pivots within a travel area that defines a travel area profile, wherein each of the second set of stator teeth is outside the travel area profile.

4. The device of claim 3, wherein each of the first set of stator teeth is within the travel area profile.

5. The device of claim 3, wherein the travel area defines a geometric plane that intersects the wire windings of the second set of stator teeth.

6. The device of claim 3, wherein the sides of each wire winding opposite to the actuator arm are substantially coplanar.

7. The device of claim 1, wherein the stator lamination includes a ring that connects to each of the first and seconds sets of stator teeth, the ring having two bends that separate a lower portion and an upper portion, the lower portion connecting to each of the first set of stator teeth and the upper portion connecting to each of the second set of stator teeth.

8. The device of claim 7, further comprising:
  a set of support elements joined to a housing of a disc drive to position a side of the stator lamination relative to the housing,
  wherein the support element(s) of the set of support elements adjacent to the lower portion are shorter than the support element(s) of the set of support elements adjacent to the upper portion such that difference in height within the set of support elements matches the difference in height of the upper portion and the lower portion.

9. The device of claim 1, wherein the first and seconds sets of stator teeth are divided among three phases of the motor, each phase consisting of one stator tooth from the first set of stator teeth and two stator teeth from the second set of stator teeth.

10. The device of claim 1, wherein the windings on teeth within a phase are electrically coupled in series and the electrically coupled windings of each phase have the same resistance and inductance as the electrically coupled windings of every other phase.

11. The device of claim 1, further comprising a data storage disc, wherein the motor is a spindle motor operable to rotate the data storage disc.

12. A method comprising:
winding wire having a first diameter on each of a first set of stator teeth of a stator lamination of a stator for a motor; and
winding wire having a second diameter on each of a second set of stator teeth of the stator lamination, wherein the second diameter is greater than the first diameter, wherein the first and seconds sets of stator teeth are divided among at least two phases of the motor, wherein each phase includes an equal number of stator teeth from the first set of stator teeth and an equal number of stator teeth from the second set of stator teeth.

13. The method of claim 12, wherein the wire in each phase has the same resistance and inductance as the wire in every other phase.

14. The method of claim 12, further comprising electrically coupling the wire winding on the stator teeth in series for each of the at least two phases by soldering wire wound on the first set of stator teeth from a phase to wire wound on the second set of stator teeth from the same phase.

15. A stator for a motor comprising:
a stator lamination including:
a ring with two bends to separate a lower portion and an upper portion of the ring,
a first set of stator teeth that connect to the lower portion, and
a second set of stator teeth that connect to the upper portion; and
a first set of windings with a first wire on the first set of stator teeth; and
a second set of wire windings with a second wire on the second set of stator teeth,
wherein the diameter of the second wire is greater than the diameter of the first wire,
wherein the first and seconds sets of stator teeth are divided among at least two phases of the motor, wherein each phase includes an equal number of stator teeth from the first set of stator teeth and an equal number of stator teeth from the second set of stator teeth.

16. The stator of claim 15, wherein the ring is an outer ring and all of the stator teeth in the stator lamination are aligned at an inner diameter of the stator lamination.

17. The stator of claim 15, wherein the second set of stator teeth includes exactly twice as many stator teeth as the first set of stator teeth.

18. The stator of claim 15, wherein all of the stator teeth in the stator lamination are spaced equally apart from each other on the ring.

19. The stator of claim 15,
wherein the motor is a spindle motor for a disc drive, and
wherein each of the first set of wire windings has fewer turns than each of the second set of wire windings.

20. The stator of claim 15,
wherein the motor is a spindle motor for a disc drive, and
wherein each of the first set of wire windings has substantially the same number of turns as each of the second set of wire windings.

21. The device of claim 1, wherein the first wire and the second wire each have circular cross-sections.

22. The device of claim 1, wherein the first wire is a first insulated wire and the second wire is a second insulated wire.

* * * * *